(12) United States Patent
Gengenbach

(10) Patent No.: US 8,355,265 B2
(45) Date of Patent: Jan. 15, 2013

(54) DC-TO-DC POWER CONVERSION

(75) Inventor: Gary A. Gengenbach, Carmel, IN (US)

(73) Assignee: Mechanical Electrical Systems, Inc., Indianapolis, IN (US)

( * ) Notice: Subject to any disclaimer, the term of this patent is extended or adjusted under 35 U.S.C. 154(b) by 0 days.

(21) Appl. No.: 13/047,754

(22) Filed: Mar. 14, 2011

(65) Prior Publication Data

US 2011/0216562 A1    Sep. 8, 2011

Related U.S. Application Data

(60) Provisional application No. 61/313,778, filed on Mar. 14, 2010.

(51) Int. Cl.
*H02M 3/335* (2006.01)

(52) U.S. Cl. ........................................................ 363/17

(58) Field of Classification Search .................. 363/2, 4, 363/17, 148, 149, 152, 153, 157, 159, 163, 363/164, 165, 170, 173, 15, 16
See application file for complete search history.

(56) References Cited

U.S. PATENT DOCUMENTS

| | | | | |
|---|---|---|---|---|
| 5,027,264 A | * | 6/1991 | DeDoncker et al. | 363/16 |
| 5,343,079 A | * | 8/1994 | Mohan et al. | 307/105 |
| 5,521,487 A | * | 5/1996 | Liu | 323/207 |
| 6,944,033 B1 | * | 9/2005 | Xu et al. | 363/16 |
| 7,453,331 B2 | * | 11/2008 | Engelage | 333/181 |
| 7,518,886 B1 | * | 4/2009 | Lai et al. | 363/17 |
| 7,768,800 B2 | * | 8/2010 | Mazumder et al. | 363/17 |
| 7,885,089 B2 | * | 2/2011 | Rozman et al. | 363/98 |
| 8,064,227 B2 | * | 11/2011 | Namuduri et al. | 363/17 |
| 8,071,232 B2 | * | 12/2011 | Ishikawa et al. | 429/61 |

OTHER PUBLICATIONS

Yaskawa Electric Corporation, Super Energy-Saving Medium-Voltage Matrix Converter With Power Regeneration; FSDrive-MX1S, Literature No. KAEP C710688 00A, Japan, Feb. 2006, 16 pages.

* cited by examiner

*Primary Examiner* — Gary L Laxton
(74) *Attorney, Agent, or Firm* — Frost Brown Todd LLC

(57) ABSTRACT

Systems and methods for managing interaction between inverter-based DC and other power systems are disclosed. In one embodiment, a 3-phase isolation transformer is fluxed to create a 3-phase rotating field from the output of a source inverter. An inductive filter turns that output into three sine waves. A secondary inverter regenerates the system, sometimes after the isolation transformer is fluxed, and by advancing or retarding the secondary inverter's phase, current (and, thus, the DC voltage and power direction) is controlled. In another embodiment, an inverter is supplied by a DC source. The inverter is controlled to match its output voltage, current, and phase to a live AC grid, then the two are connected. The inverter frequency is then driven to advance the phase of the inverter in relation to the grid. Alternatively, the inverter voltage is then driven at a level greater than that of the grid.

20 Claims, 7 Drawing Sheets

DC-TO-DC POWER CONVERSION

REFERENCE TO RELATED APPLICATION

This application is a nonprovisional of, and claims priority to, U.S. Provisional Application No. 61/313,778, filed Mar. 14, 2010, with title "Rapid-Transfer Controller for Supplemental Power Generators," pending. The entire disclosure in that application is incorporated herein by reference as if fully set forth.

FIELD

The present disclosure relates to electric power conversion systems. More specifically, the present invention relates to managing the interaction between inverter-based DC systems and other power systems.

SUMMARY

Figure 1:
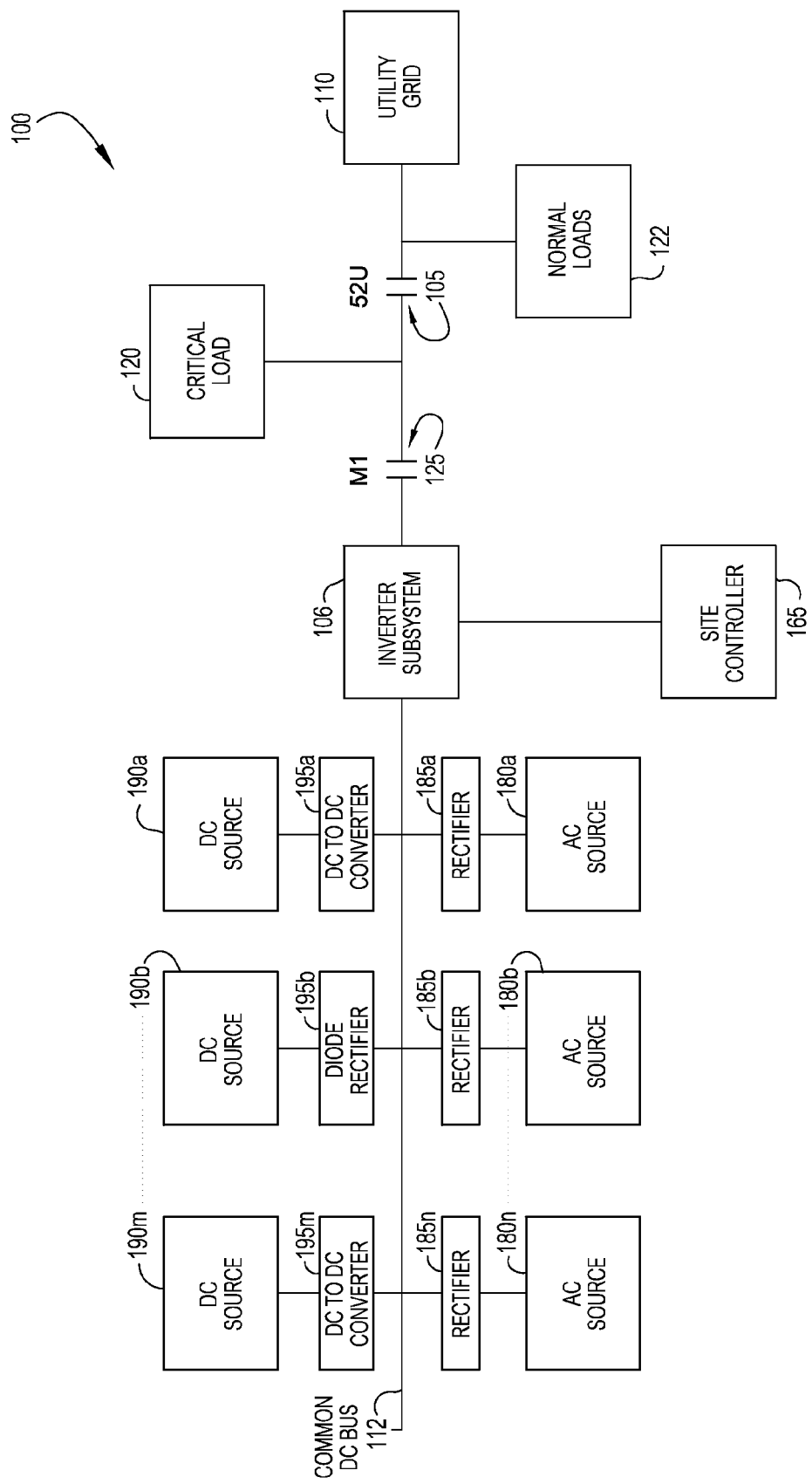
FIG. 1 is a block diagram of a first embodiment of substantially bumpless transfer grid synchronization.

In one implementation, a DC-to-AC converter system manages intentional islanding of the connection between an electric utility grid, an electrical load, and an alternate AC power source; and the alternate AC power source is capable of coordinating reconnection to the grid in a process of substantially bumpless transfer grid synchronization. The alternate AC power source, the grid synchronization inverter, is supplied by inputs from a common DC bus attached to the grid synchronization inverter, such as a direct or converted DC input from a battery or photovoltaic supply, a DC generator with a diode rectifier, or a rectified AC input from a generator or windmill, for example. When supplemented with appropriate input power sources (e.g., battery or capacitor, and/or a generator set) this configuration will allow maintenance of a critical load should the grid be disrupted, operate in an island mode by dropping out a grid contactor, and then will synchronize and provide a substantially bumpless reconnection to the grid when power is restored.

In another implementation, a DC-to-DC power converter system manages transforming and isolating power with off-the-shelf inverter technology, using components of a DC-to-AC converter (as described in the first implementation above), coupled with an AC to DC converter, via an inductive filter. The second implementation relates a new and inventive field of technology where DC power needs to be (1) converted to a different DC voltage or to a higher potential; (2) isolated, for the purpose of electrical isolation or for safety; or (3) stored, as in a battery, capacitor, ultracapacitor, or other form of DC storage.

DESCRIPTION

For the purpose of promoting an understanding of the principles of the present invention, reference will now be made to the embodiments illustrated in the drawings, and specific language will be used to describe the same. It will, nevertheless, be understood that no limitation of the scope of the invention is thereby intended; any alterations and further modifications of the described or illustrated embodiments and any further applications of the principles of the invention as illustrated therein are contemplated as would normally occur to one skilled in the art to which the invention relates.

First Embodiment

A feature of successful micro-grids is the ability to maintain power to a critical load, disconnect from the utility grid if utility grid power goes away, and reconnect to the grid when power returns without disrupting operation of the critical load. FIG. 1 illustrates the general structure of a first embodiment, system 100, which uses an arbitrary number of DC and AC power sources to supply power to inverter subsystem 106. Inverter subsystem 106 uses a series of contactors and sensors to connect to utility grid 110 and to provide uninterruptible power to critical load 120, as described in detail herein. As shown in FIG. 1, inverter subsystem 106 uses power from common DC bus 112, which is fed by an arbitrary number of DC sources 190a, 190b, . . . , 190m, each of which may employ a DC-to-DC converter 195a, 195b, . . . , 195m, as well as an arbitrary number of AC sources 180a, 180b, . . . , 180n in combination with rectifiers 185a, 185b, . . . , 185n. Each AC input 180x may include an AC genset or windmill connected to rectifier 185x, for example, and rectifier 185x may consist of a full-wave bridge rectifying circuit or a dedicated inverter working as an active rectifier. Each DC power input consists of a DC source 190x in the form of a photovoltaic (PV) panel array, a battery, an ultra-capacitor, or another form of DC storage or supply. Each DC source 190x connects to common DC bus 112 through a DC-to-DC Converter 195x if required to obtain isolation, power conversion, and/or bidirectional power flow. Also, a diode rectifier 195x could be used in place of a DC-to-DC converter 195x, for example on a large DC generator. Site controller 165 controls and coordinates power flow and storage on the common DC bus 112 power inputs, or can provide additional AC power back to critical load 120, normal loads 122, or even utility grid 110.

State Diagram

Figure 2:
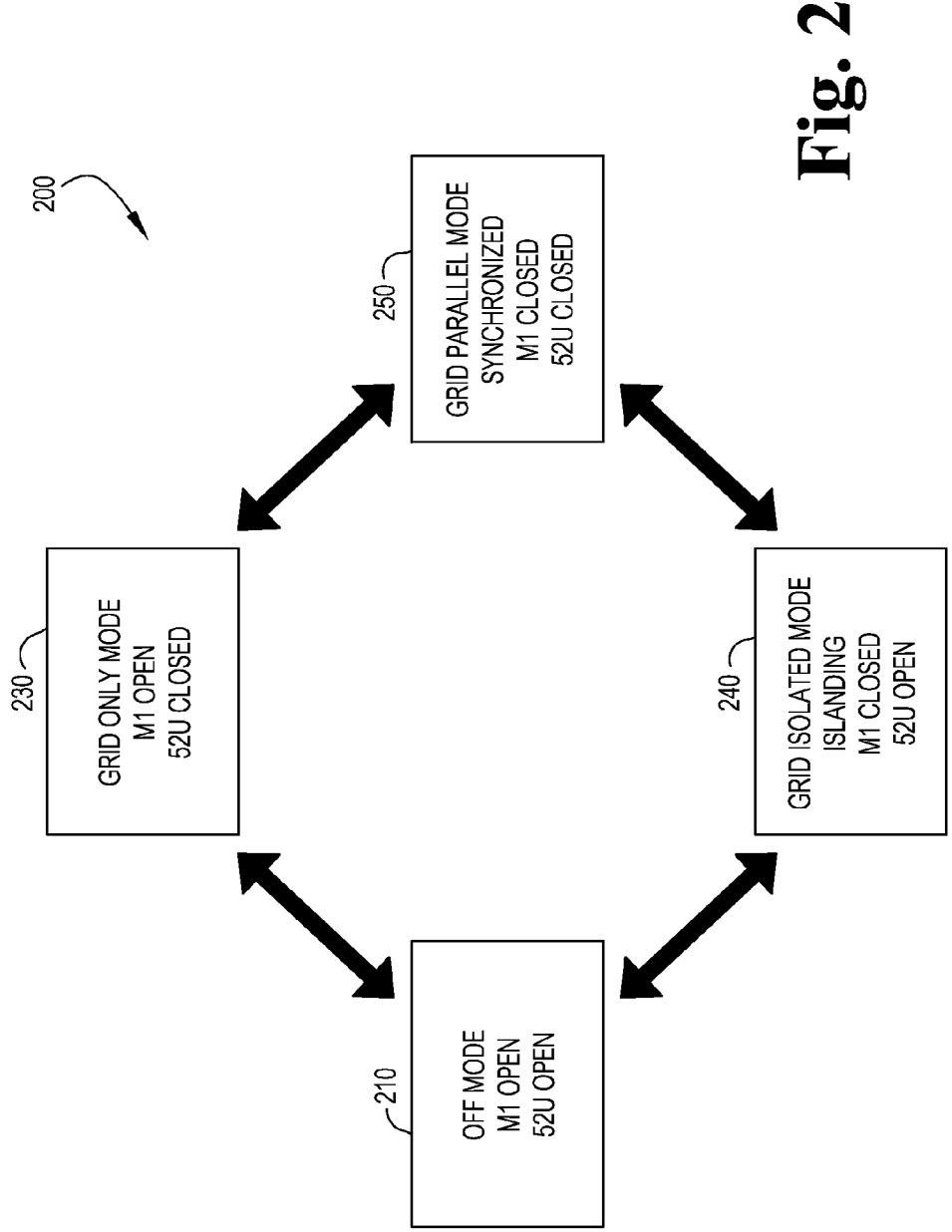
FIG. 2 is a state diagram for the embodiment of FIG. 1.

The site controller 165 has four operational hardware states, which are presented in system 200 as the hardware state diagram shown in FIG. 2. They are (1) off mode 210, wherein both the M1 contactor 125 and 52U contactor 105 are open; (2) grid only mode 230, wherein the M1 contactor 125 is open and 52U contactor 105 is closed; (3) grid isolated mode 240 or islanding (per IEEE 1547), wherein the M1 contactor 125 is closed and 52U contactor 105 is open; and (4) grid parallel mode 250, wherein both the M1 contactor 125 and 52U contactor 105 are closed.

The site controller 165 operates in grid parallel mode 250 when the inverter subsystem 106 is connected to the grid 110 (i.e., both M1 contactor 125 and 52U contactor 105 are closed). In grid parallel mode 250, inverter subsystem 106 is synchronized to the utility grid 110, so the grid (in conjunction with the current limit of inverter subsystem 106) effectively controls the frequency of inverter subsystem 106. The current limit of inverter subsystem 106 will fold back the frequency (or phase advance) of inverter subsystem 106 to maintain the current limit of power output to utility grid 110.

The site controller 165 regulates the amount of power supplied by the various AC sources 180x and DC sources 190x, which supply output to the load. The power flow is controlled by site controller 165 and may be directed to charge or discharge the DC storage devices and thus import or export power based on the estimated or immediate cost and availability of power. Also, inverter subsystem 106 provides power factor correction to utility grid 110 anytime it is connected to utility grid 110 in grid parallel mode 250. In this mode, the critical load 120 has both a primary and a secondary power source working simultaneously.

In grid isolated mode 240, also known as "islanding," inverter system 106 opens 52U contactor 105 and maintains M1 contactor 125 closed, thus supplying all power to the critical load 120. Inverter subsystem 106 controls the AC frequency to critical load 120 while in grid isolated mode 240. Islanding typically would be employed in the case of loss of utility grid 110 power and, when the grid 110 was restored, inverter system 106 would then reconnect to the grid in a current-limited, phase-synchronized bumpless fashion.

In grid only mode 230, the 52U contactor 105 is closed and M1 contactor 125 to inverter subsystem 106 is open. This control state is used in the case of photovoltaic sources at night, wind generators when there is no wind, when the business case for running the generator is more expensive than buying power from the utility grid 110, or when a generator is down, for example.

Software Schematic

Figure 3:
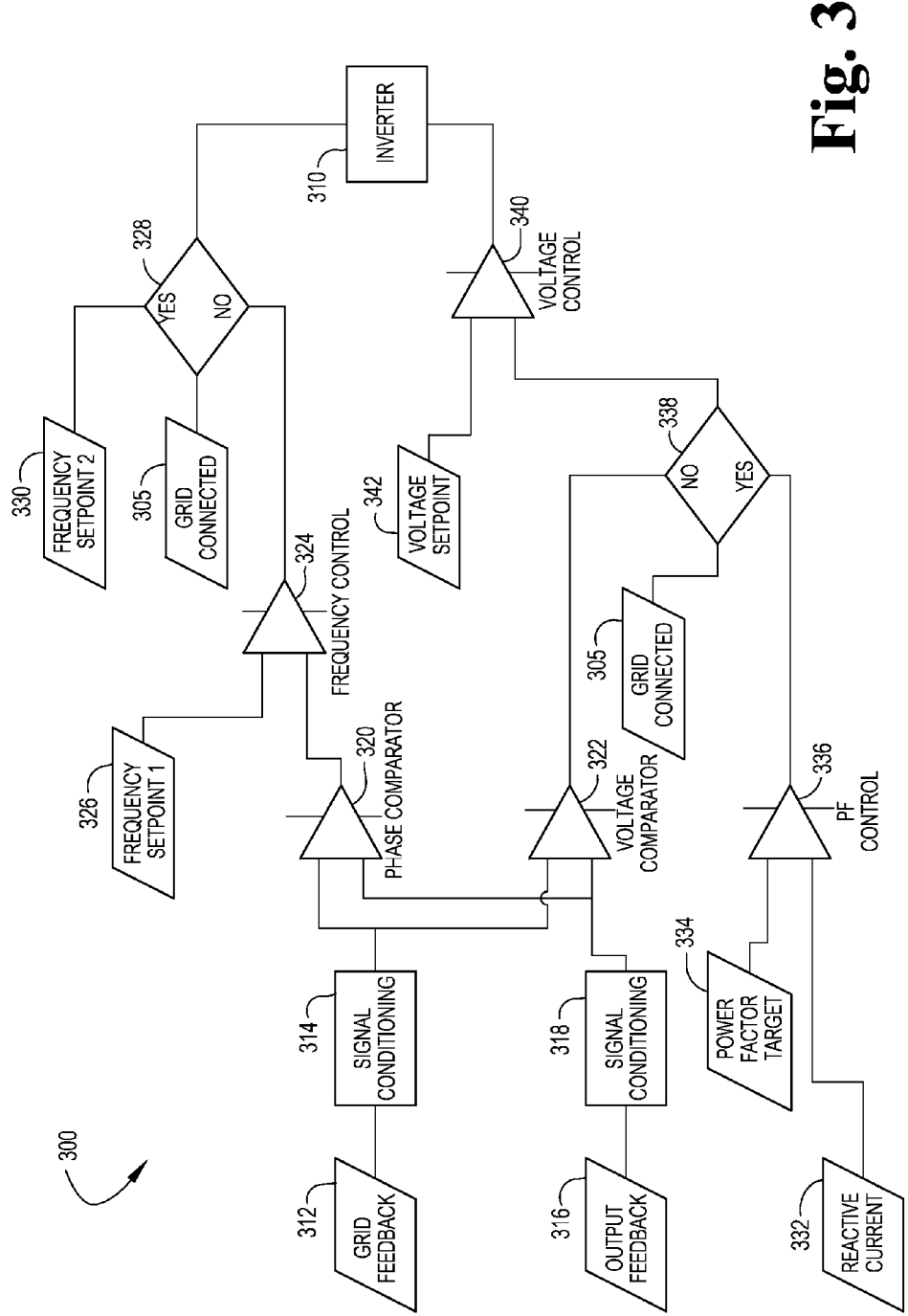
FIG. 3 is a schematic drawing illustrating the control software functionality for the inverter in the embodiment of FIG. 1.

FIG. 3 illustrates the general process flow of the inverter control software. Software system flow 300 uses several state inputs and settings to control the drive 310 of inverter subsystem 106. In this situation, as an example, as the system is controlling drive 310's frequency, it collects grid feedback 312 through signal conditioning circuitry 314 and collects inverter output feedback 316 through signal conditioning circuit 318. Phase comparator 320 outputs a signal corresponding to the phase difference between the grid signal and the inverter output. Frequency control circuit 324 uses the output of phase comparator 320 and a first frequency set point 326 to generate a frequency control feedback signal. If according to signal 305 the grid is not connected, multiplexer 328 passes the frequency control output signal 324 to drive 310. If according to signal 305 the grid is connected, multiplexer 328 passes second frequency set point 330 to drive 310 as its control signal.

Voltage comparator 322 outputs a signal that indicates the relative voltage levels of the conditioned grid feedback and the conditioned inverter output feedback. Reactive current feedback 332 and power factor target value 334 are considered by power factor control circuitry 336 to yield a voltage adjustment signal effective to move the inverter's power factor toward unity. If signal 305 indicates that the grid is connected, decision block 338 selects the output of power factor control circuit 336 and passes it to voltage control logic 340. If signal 305 indicates that the grid is not connected, decision block 338 selects the output of voltage comparator 322 and passes it to voltage control logic 340. Voltage control logic 340 combines that information with voltage set point 342 and outputs a voltage control signal for drive 310. Drive 310 takes the appropriate input depending on its mode (if in frequency-control mode, the signal selected by decision block 328; or if in voltage-control mode, the output of voltage control logic 340) and adjusts its performance accordingly.

Second Embodiment

Generally, one form of the present system is a Battery-to-Common DC Bus Converter system. On a battery, the system provides isolation, which can help prevent a catastrophic ARC flash, and also provides bi-directional energy management, regardless of voltage potential (certain laws of physics apply in regard to the hardware specific to the application). The inverters in these systems are coupled using a three-phase LCL filter or other inductive filter. By processing three-phase power rather than single-phase power in the conversion, both current and voltage ripple are significantly reduced, allowing for higher efficiencies. (By some estimates, single-phase voltage ripple requires approximately six times as much filtration as three-phase ripple.)

Figure 4:
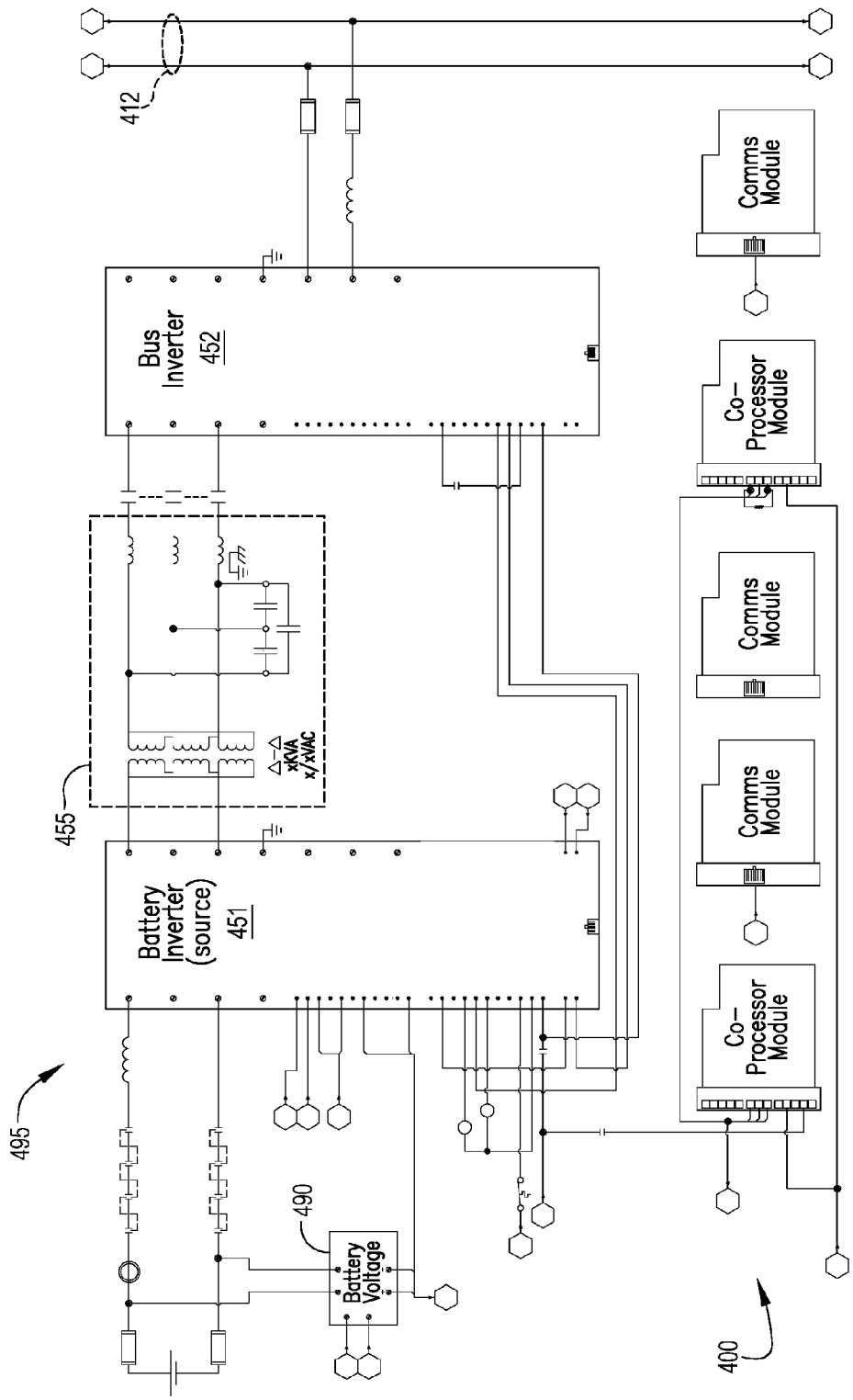
FIG. 4 is a schematic diagram of a second embodiment showing a battery-to-common DC bus, DC-to-DC converter.

Turning to system 400 in FIG. 4, one DC-to-DC converter system 495 works with a lithium ion automotive battery having a voltage range of ~250 VDC to ~390 VDC. With this particular system, the battery source inverter 451 produces an AC three-phase rotating electrical field at 176 VAC. This three-phase rotating electrical field (similar to that provided to a motor winding) powers the generating electrical field (here, the secondary of the LCL filter 455) with a ratio of 208/480 VAC and generates 406 VAC (574 VDC peak) to a three-phase bus inverter 452, which in turn can boost the voltage to 625 to 780 VDC in order to power an isolated and boosted common DC bus 412. Voltage gain, current (or power) regulation, and isolation are all features of the DC-to-DC converter system 495. In the case of a micro grid, the DC-to-DC converter system 495 provides both voltage gain and isolation. In typical operation, the battery source inverter 451 threshold detector (drive comparator circuit) senses that there is sufficient voltage to flux the three-phase transformer of LCL filter 455. If there is sufficient power, the battery source inverter 451 will run to the specified operating frequency (typically 60 Hz) or to the transformer fluxing frequency of LCL filter 455. The transformer fluxing voltage is generally set about 5 to 10% below the value of the common DC bus 412 voltage divided by the square root of two (176=~250/1.414). Once the battery source inverter 451 (or primary drive) is at the fluxing frequency, the "enable" signal is transferred to the secondary (synchronizing, or regenerative) bus inverter 452. The bus inverter 452 then synchronizes to the LCL filter secondary coils (battery source inverter 451 frequency) by the means of an internal inverter synchronizer for 60 Hz (or, in the illustrated embodiment, any frequency from 0 to 100 Hz) or to a secondary analog or digital synchronizer (not shown, see FIG. 6) for target frequencies of 400 Hz or greater. Once the synchronization process is "phased," additional voltage gain beyond the square root of two can be attained on the isolated DC bus of secondary bus inverter 452. At this point the secondary bus inverter 452 can control power flow by voltage set point, current set point, motoring current, regenerative current, and symmetrical current, which are set so as not to stall or over-current the source battery inverter 451, nor saturate the transformer of LCL filter 455.

Third Embodiment

Figure 5:
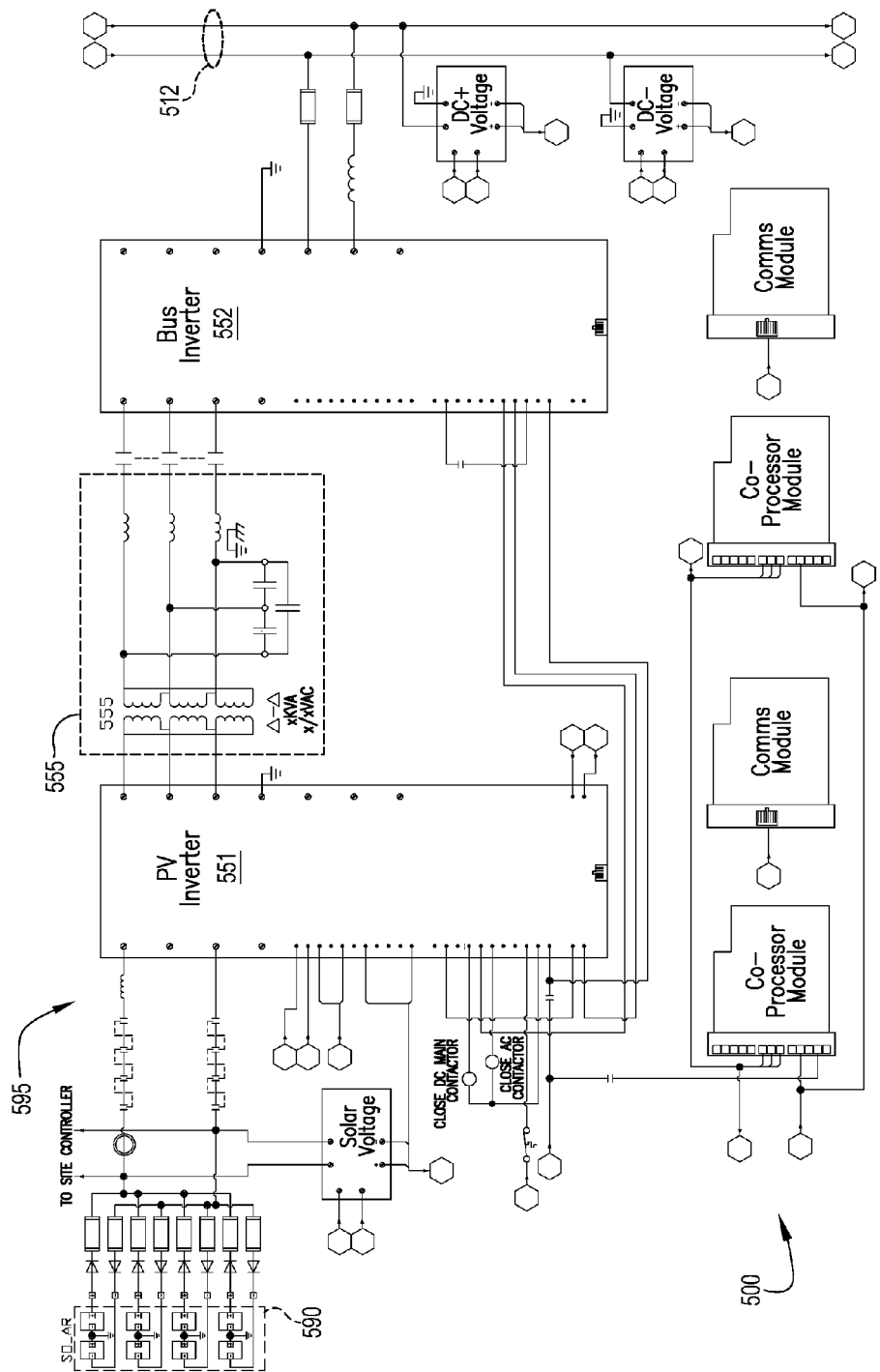
FIG. 5 is a schematic diagram of a third embodiment showing a photovoltaic-to-common DC bus, DC-to-DC converter.

A third embodiment of the present system shown in FIG. 5, is a photovoltaic to common DC bus, DC-to-DC converter 595 application, where the photovoltaic source panel 590 operates below 600 VDC (typical output range of 400 to 600 VDC). In order to make quality 480 VAC power for a substantially bumpless transfer grid synchronization, DC-to-AC converter, the photovoltaic source 590 output is up-converted to a voltage above 650 VDC, for example, in applications such as a substantially bumpless transfer grid synchronization system, or with a micro grid. In this exemplary PV implementation, a typical unloaded circuit would be slightly under 600 VDC on a sunny day. Under load, that voltage needs to be pulled down towards 400 VDC to move power. As that voltage is pulled down towards 400 VDC with this particular system, the PV source inverter 551 produces an AC three-phase rotating electrical field at 176 VAC as in the previous discussion. This three-phase rotating electrical field (similar to that provided to a motor winding) powers the generating electrical field (here, the secondary of the LCL filter 555) with a ratio of 208/480 VAC and generates 406 VAC (574 VDC peak) to a three-phase bus inverter 552, which in turn can boost the voltage to 625 to 780 VDC, in order to power an isolated and boosted common DC bus 512. Voltage gain, current (or power) regulation, and isolation are all features of this photovoltaic to common DC bus, DC-to-DC converter system 595, as described above.

Fourth Embodiment

Figure 6:
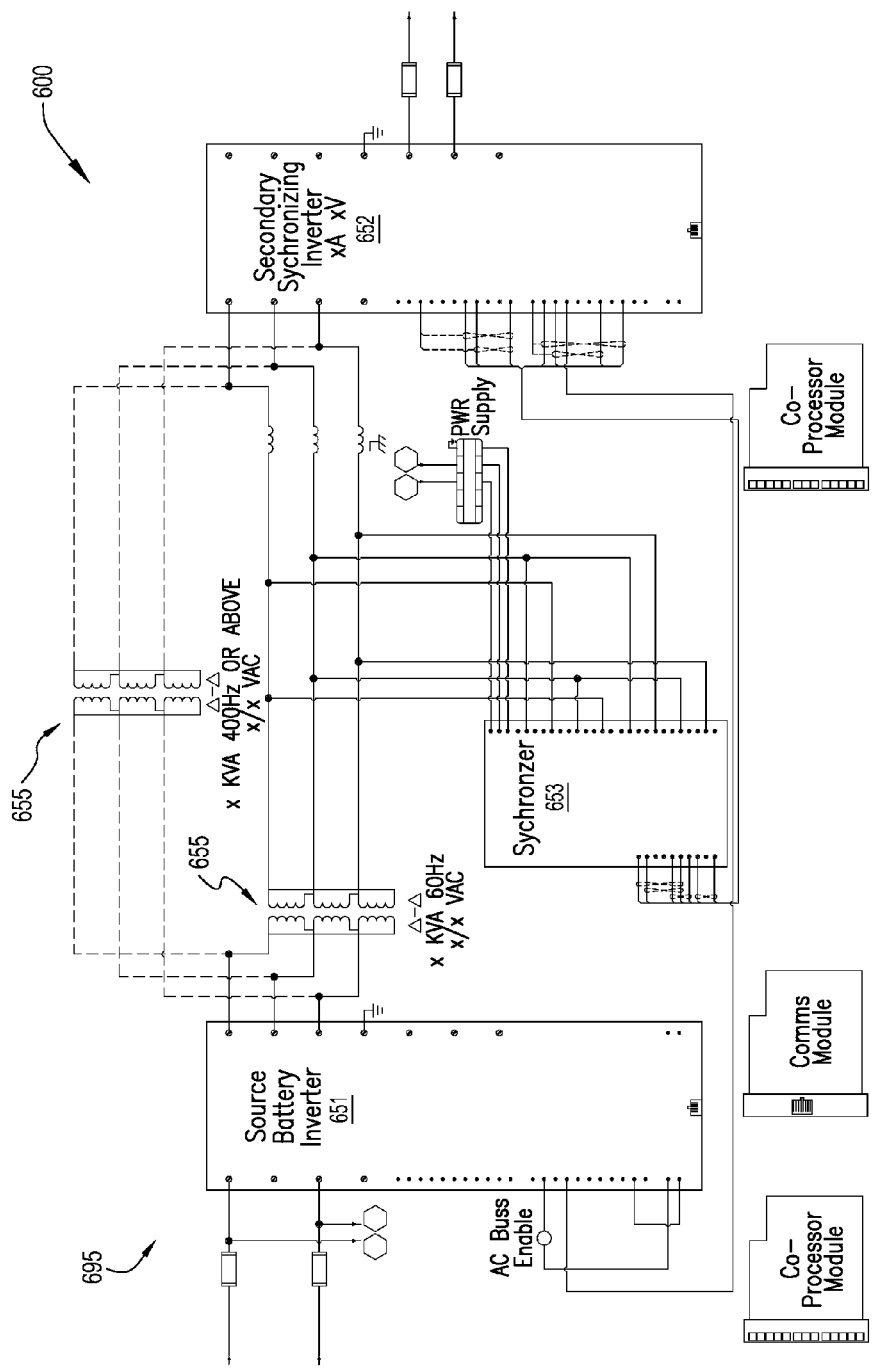
FIG. 6 is a schematic diagram of a fourth embodiment showing a battery-to-battery DC-to-DC converter.

A fourth embodiment of the present system is a battery-to-battery, DC-to-DC converter 695 application, where the synchronization is done external to the inverters at frequencies from 100 to 400 Hz and higher (see FIG. 6). A secondary (analog or digital) synchronizer 653 conditions and senses voltage, frequency, and phase coming from source battery inverter 651, and enables the secondary synchronizing inverter 652 to synchronize as described previously, with application for frequencies above 100 Hz.

Additional forms of the present system could substitute items as follows:

In place of an LCL filter 655, some embodiments use a 1:1 isolation transformer.

In place of the LCL filter 655, some embodiments use a transformer of any ratio to attain additional current or voltage gain.

In the LCL filter 655, a reactor is usually installed on the high voltage/low current side for cost reasons.

In some embodiments, the system can be synchronized external to the secondary synchronizing inverter 652, so that 400 Hz or other higher frequencies can be used for lowering the weight of the LCL filter.

Another form of sensing and filtering circuitry could be used in place of the secondary synchronizer 653, such as transformer or op-amp filters.

Fifth Embodiment

Figure 7:
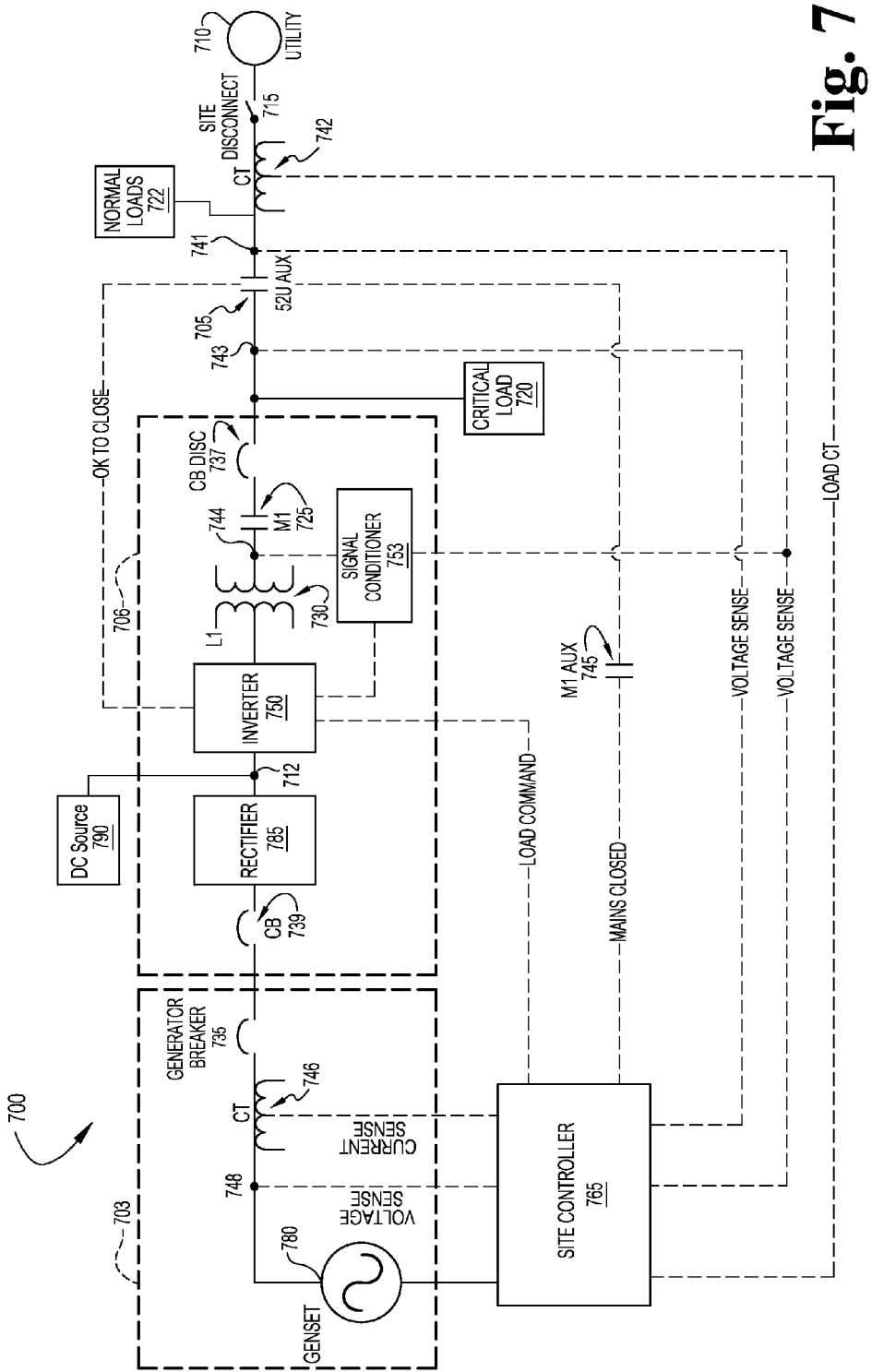
FIG. 7 is a block diagram of a fifth embodiment of substantially bumpless transfer grid synchronization.

FIG. 7 illustrates a fifth embodiment, which includes a single AC genset as a local power supply. System 700 connects to utility grid 710 through site disconnect switch 715. Load-following CT 742 detects the current at that point in the circuit and provides the detected value to site controller 765. This segment of the circuit provides power to normal loads 722, generally only under power from grid 710. Voltage sensor 741 provides an output voltage sense signal to inverter 750 in inverter subsystem 706, and to site controller 765. Contactor 705 (also known as "52U") controllably interrupts the flow of power from inverter subsystem 706 to the normal loads 722 and utility grid 710, providing an auxiliary contactor status output both to inverter 750 and through the auxiliary switch 745 of M1 contactor 725 to site controller 765.

On the inverter side of 52U contactor 705, sensor 743 provides a voltage sense signal to site controller 765, and critical electrical load 720 connects to the AC bus to receive power. Protecting the loads from faults in inverter subsystem 706 and genset subsystem 703, circuit breaker 737 is connected in series between 52U contactor 705 and controllable M1 contactor 725 to LCL-filter 730, such as a delta-wye transformer (for example and not as a limitation). Sensor 744 provides a voltage sense signal to inverter 750 for uses that are discussed elsewhere herein. AC power from genset subsystem 703 is provided through circuit breaker 739, which is rectified to DC by rectifier 785, connected to common DC bus 712, and transformed to AC power by inverter 750, which provides it to LCL-filter 730 for powering the loads 720 and 722.

Genset subsystem 703 provides power to the inverter subsystem 706, such as from a local fuel source. In this example system, genset 780 is controlled by site controller 765 to generate power through generator breaker 735 to inverter subsystem 706. Genset 780 in this example is a generator powered by natural gas, biogas, or other fuel source. Current transformer 746 measures the current being output by genset 780 for site controller 765, and sensor 748 provides a generator output voltage sense signal to site controller 765 as well. Site controller 765 controls the operation and output of genset 780 as will be understood by those skilled in the art.

With additional reference to FIG. 7, the site controller 765 operates in grid parallel mode 250 when the inverter subsystem 706 is connected to the grid 710 (i.e., both M1 contactor 725 and 52U contactor 705 are closed). In grid parallel mode 250, inverter 750 is synchronized to the utility grid 710 and the grid effectively controls the inverter 750 frequency, while the site controller 765 regulates the throttle of genset 780 to control its output to the load. For the system 700 to operate optimally in grid parallel mode 250, the site controller 765 preferably regulates its output to control the speed of genset 780.

In grid isolated mode 240, the site controller 765 regulates both the output voltage and frequency of genset 780. Inverter 750 regulates its own output voltage and frequency, and its output current in proportion to a signal from site controller 765.

Any change in the load 720 results in a change in the common DC bus 712 voltage of the inverter 750. The genset subsystem 703 adjusts its output voltage to maintain the common DC bus 712 to the inverter subsystem 706. The inverter subsystem 706 limits its output current to prevent a bus undervoltage condition caused by the limitations (maximum KW output or ramp rate, for example) of the components in the system. These limits are preferably configurable parameters of site controller 765.

In the grid parallel mode 250 of inverter 750, the site controller 765 adjusts the speed/frequency of the genset 780 in response to the load demand. Any changes in frequency result in a change in the analog "load command" signal sent to the inverter 750. The inverter 750 then regulates its output current to maintain the desired frequency of the genset 780.

When the system is operating in grid parallel mode 250, genset subsystem 703 provides AC output power through closed generator breaker 735 to inverter subsystem 706. The rectifier 785 of inverter subsystem 706 converts the AC power to DC and connects to common DC bus 712, connected to inverter 750, which converts power to AC and provides output power to critical load 720 and, if 52U contactor 705 is closed, to normal loads 722 and even to utility grid 710. In this example, however, system 700 is installed in a situation where loads 720 and 722 are already connected to a utility grid 710, and genset subsystem 703 and inverter subsystem 706 are not yet energized (so M1 contactor 725 is open, and 52U contactor 705 is closed). The system 700 then transitions through a "normal start" state transition process. The (human) operator inserts a key into the inverter subsystem 706 and switches it on, presses an "automatic on" control and site controller 765 begins operation of the genset subsystem 703, which then starts up. The site controller 765 notes that the mains (52U)

contactor 705 is closed, but M1 contactor 725 is open, so it closes generator breaker 735 and enters grid isolated mode 240 of operation. Inverter 750 then wakes up, senses the mains voltage (using sensor 741), and synchronizes to the grid as discussed herein. When inverter 750 is synchronized, it senses the closed state of 52U contactor 705 and its synchronism to the grid 710, closes M1 contactor 725, and enters grid parallel mode 250. Site controller 765 senses the closing of 52U contactor 705 and also switches to its grid parallel mode 250 of operation.

One of the well known problems with providing alternative power sources to grid-connected loads is handling a failure of the grid. Prior to the failure, we presume that the system 700 is operating in normal grid parallel mode 250 as described above. Prior to the loss of grid power, genset 780 is operational, generator breaker 735 and circuit breaker 739 are closed, inverter 750 is on and synchronizing in grid parallel mode 250, and M1 contactor 725, circuit breaker 737, and 52U contactor 705 are all closed. When the voltage provided by utility grid 710 drops below an acceptable level, 52U contactor 705 opens. Site controller 765 detects this opening (through the auxiliary status output of 52U contactor 705) and changes from grid parallel mode 250 to grid isolated mode 240. With both subsystems in grid isolated mode 240 and 52U contactor 705 open, the genset subsystem 703 and inverter subsystem 706 provide power to critical load 720 while effectively disconnected from utility grid 710.

In such situations, the grid typically recovers after a period of time and resumes making power available. At this point, site controller 765 is operating in grid isolated mode 240, converting the output of genset 780 into AC to power critical load 720. 52U contactor 705 is open, so normal loads 722 are powered by the grid, while critical load 720 is powered by inverter subsystem 706.

When utility grid 710 resumes providing power, inverter 750 detects the voltage (through sensor 741) and synchronizes its output voltage, frequency, and phase to the supply from utility grid 710. When inverter 750 and the site controller 765 detects that synchronization has been achieved, 52U contactor 705 is commanded to close. Then, when inverter 750 senses that 52U contactor 705 has closed and that its synchronization with utility grid 710 has been maintained, it switches from grid isolated mode 240 to grid parallel mode 250. Likewise, when site controller 765 senses that 52U contactor 705 and M1 contactor 725 are closed, it also switches from grid isolated mode 240 to grid parallel mode 250. Because these modes of operation are substantially the same except for the method of controlling changes in the output of genset 780 and inverter 750, these mode changes have no instantaneous effect upon the output of inverter 750, and have little or no effect on critical load 720. At this point, then, the system has returned to normal, grid parallel mode 250.

It is also possible for genset 780 or inverter 750 to fail, and system 700 is able to maintain uninterrupted power from utility grid 710 to critical load 720 even in these conditions. For example, if genset 780 fails, inverter 750 would detect the under-voltage on the common DC bus 712, and open M1 contactor 725. Similarly, if inverter 750 fails, it opens M1 contactor 725, which site controller 765 senses and switches itself from grid parallel mode 250 to grid only mode 230. When the fault in inverter 750 is corrected, system 700 then resynchronizes with the grid and closes M1 contactor 725.

Some situations may require a "black start" from off mode 210 in which neither system 700 nor utility grid 710 is powering loads 720 and 722. This situation begins with 52U contactor 705 and M1 contactor 725 open, as is genset breaker 735. The system operator keys the system on and initiates automatic operation and "run-with-load" operation. The engine in genset 780 starts up. Site controller 765 senses the absence of mains voltage from utility grid 710 and the open state of 52U contactor 705 and M1 contactor 725, so it closes generator breaker 735 and enters grid isolated mode 240. Sensing the output of genset 780, inverter 750 wakes up. It senses no mains voltage from utility grid 710 and the open state of 52U contactor 705, generates an internally maintained sine-wave output at an appropriate frequency and voltage, closes M1 contactor 725, and enters grid isolated mode. At this point, system 700 is islanding and powering critical load 720 independently of utility grid 710.

During each transition in which the inverter subsystem 706 output is being synchronized to the utility grid 710 in this embodiment, system synchronization occurs through voltage match, frequency match, and phase match using a unique combination of signal conditioning boards (double Butterworth design), inverter hardware, and drive programming. The system is configured with contactors on both the grid side (52U) and the auxiliary supply side (M1) of the critical load 720, whereas many similar designs use shunt trip breakers. Signal conditioning boards monitor voltage on the line/grid side of the 52U contactor 705 and the inverter side of the M1 contactor 725, and function to match voltage, phase, and frequency during synchronization. The signal conditioning board is set up as a low-pass filter to remove PWM frequencies typically at 3 KHz, and to pass the 50 to 60 Hz signal. Alternatively, sensing and filtering circuitry might be comprised of transformers or op-amp filters. The inverter technology used in this electrical control configuration is implemented using a modular PWM based IGBT inverter, a programming module, and regenerative hardware with an IEEE 519 PWM filter; and can produce a variable output frequency of, for example, either 50 or 60 Hz. The LCL harmonic filter 730 in this embodiment is an output inductor coupled with a three-phase capacitor and uses an output transformer (for example and not as a limitation), to complete the LCL circuit, as typically applied to regenerative AC drive systems and dynamometers.

To match voltage in this embodiment, the DC bus minimum control limit is maintained above the commanded output AC voltage peak produced by the inverter 750. Transformers are used if necessary to satisfy voltage-matching requirements if the generated DC voltage supplied to the inverter does not exceed the AC sine peak with sufficient voltage potential to meet IEEE 519. Typically, in this example, one would set a commanded output voltage of 420 VAC for the motor nameplate (rated motor voltage drive parameter) to provide sufficient headroom between the DC bus voltage (such as 650 VDC for a 460-volt inverter) and the peak voltage of the simulated 60 Hz AC output from inverter 750 (such as 600 VDC for a 420-volt rated output). Voltage matching is accomplished by detecting output line voltage (in this case, transformed output from LCL filter 730) at the M1 contactor 725 by the signal conditioning circuit detecting voltage sense 744, and applying PID loop feedback on the inverter output (in this case, 420 VAC voltage output to the transformer of LCL filter 730).

In the case of the present 460 VAC system, the inverter 750 is connected to the grid using a delta-wye transformer with an approximate value of plus/minus ten percent (+/−10%) taps, connecting the grid to the wye side of the transformer, and connecting the inverter to the minus ten percent taps on the delta side of the transformer in LCL filter 730. This specified transformer configuration provides a voltage boost to the inverter output to compensate for the limited inverter output voltage, as described herein (i.e., to provide the necessary headroom (50 to 60 VDC) thus assuring the DC bus is higher in voltage than the peak of the AC line (i.e., PWM carrier frequency) generated by inverter 750). The same effect could be obtained in other implementations of this example design by increasing the generator output capacity to maintain the desired differential between the common DC bus 712 minimum and the inverter 750 output voltage peak, or using a standard 380/460 delta-wye transformer and attaching the inverter 750 to the 380-volt delta side. Additionally, this configuration would not require a boost transformer to meet local requirements in other jurisdictions and could substitute a line reactor in the place of the transformer as part of the LCL filter 730. Still other designs will occur to those skilled in the art.

In the case of a phase loss or complete power interruption, the inverter subsystem 706 electrical control configuration equipped with a combination of battery power and a genset 780 provides for a substantially bumpless transfer from the grid. Here, the M1 contactor 725 is maintained in the closed position, and the battery DC source 790 provides instantaneous ride-through while the genset 780 starts up. Alternatively, with a genset running 24/7, no battery would be needed as described in the FIG. 7 example above. Ideally, the inverter 750 provides a current-limit drive status, with a microsecond current-loop update rate. In this example, the inverter 750 current-limit drive status parameter provides a deterministic heartbeat for monitoring grid presence, with an update rate that meets UL 1741 requirements, thus providing anti-islanding protection based on current loop update trends within the inverter. The 52U contactor 705 opens when the grid failure is detected and the electrical control configuration operates in an "islanding mode," or grid isolated mode 240, waiting for the grid to be restored.

Upon return of grid power, the signal conditioning circuit for the grid side of 52U contactor 705 detects voltage and frequency for all three phases of utility grid 710. The inverter 750 control loops coupled with the signal conditioner 753 conditioning board matches voltage and frequency for two phases, and uses the third phase in a comparator circuit to determine whether the inverter 750 is in phase with the utility grid 710, or 180 degrees out of phase. Once voltage and phases are within specification, the phase-lock comparator circuit provides a digital input to the inverter, allowing the 52U contactor 705 to close. The phase-lock loop control can be located on the signal conditioner 753, an external analog signal conditioning board, or can be a digital signal internal to inverter 750 using the drive coprocessor, for example. When 52U contactor 705 and M1 contactor 725 close, ideally a bit shift in the drive operating program brings in a fixed offset, which commands the inverter 750 output frequency faster than the utility grid 710 frequency, and thus permits the current limit drive parameter to control the inverter 750 output. Once the 52U contactor 705 is closed, the inverter shifts modes from grid isolated mode 240 to grid parallel mode 250 and is locked in phase with the grid to complete substantially bumpless transfer grid synchronization. Finally, the power factor control loop is enabled, gradually adjusting inverter output until unity power factor is achieved.

As an example and not as a limitation, the current-controlled solution used in the present substantially bumpless transfer grid synchronization system distinguishes this approach from other synchronizing techniques, which typically use voltage control. Current-limited, phase-synchronized, substantially bumpless transfer operation is achieved in this embodiment by limiting the in-rush current while setting the motoring current limit to approximately 10% above the critical load, allowing the 52U contactor 705 to close without causing a cascading failure of over-current check devices. One skilled in the art of electronic controls will appreciate the plethora of other control systems beyond this example that will accomplish the scope and spirit of the complete invention contained herein.

Alternative Implementations

Now as an example and not as a limitation, DC-to-DC conversion also has application for time shifting the availability of grid power from off-usage night time hours to peak demand time frames by storing DC potential in batteries during the evenings and returning it to the grid during daytime peak demand hours. Also, using solar- and wind-generated power during peak demand times to reduce dependency on conventional power supply sources is a rapidly growing field today, Typically, these renewable sources could be configured by one having ordinary skill in the art to wake up and synchronize to the utility grid using the substantially bumpless transfer grid synchronization technology described herein.

In some embodiments, an electrical power system serves as an alternate AC source to supply the electrical needs of, for example, a home. In this example, extra power supplied by the system but not required for the home may be sold back to the electric utility. In this same example, a combined heat and power ("CHP") system provides additional heat for the home. The control systems described herein provide uninterrupted power for the loads in the home, including a substantially bumpless transfer of supply from the grid to the local source(s) in the event of grid failure. (That is, there is no delay between failure of the grid and the effective supply of energy from local sources to the load.)

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of converting DC power in a fashion capable of bi-directional power flow, comprising inverter-based controlling of power for a DC-to-DC conversion system to:
   flux the primary of a three-phase isolation transformer to create a three-phase rotating field from a source inverter supplied by DC, where the source inverter has an output;
   turn the source inverter output into three sinusoidal waves using an inductive filter; and
   regenerate using a regenerating secondary inverter and, by advancing and retarding the phase of the sine waves, controlling output current of the source inverter using the secondary inverter;
   wherein the regenerating is controlled by a synchronizer that:
     when the inductive filter is at frequency, matches the secondary inverter voltage to the source inverter voltage;
     matches the secondary inverter frequency to the source inverter frequency;
     matches the secondary inverter phase to the source inverter phase; and
     clamps the current limit of the secondary inverter, electrically connects the secondary inverter output to the source inverter output, and scales the current commanded of the secondary inverter to the command requested by a site controller.

2. The method of claim 1, wherein the regenerating occurs after the inductive filler is at frequency.

3. The method of claim 1, wherein the inductive filter is an LCL filter.

4. The method of claim 1, wherein the inductive filter is a 1:1 isolation transformer.

5. The method of claim 1, wherein the inductive filter is a transformer.

6. The method of claim 1, wherein the inductive filter is a poly-phase filter.

7. The method of claim 1, further comprising, by advancing or retarding the phase of the secondary inverter, controls the current to or from the source inverter.

8. An apparatus for connecting a DC power source to a DC load, comprising:
- a source inverter that converts between DC power from an input DC power source and a three-phase, sinusoidal, source inverter pulse-width-modulated (PWM) output;
- an inductive filer that couples the source inverter PWM output and a three-phase, sinusoidal filter output;
- a regenerating secondary inverter that converts between the three-phase, sinusoidal filter output and the DC load; and
- synchronizer that controls the secondary inverter so that, when the inductive filter is at frequency, the secondary inverter:
  - matches the secondary inverter voltage to the source inverter output voltage;
  - matches the secondary inverter frequency to the source inverter output frequency;
  - matches the secondary inverter phase to the source inverter output phase; and
  - clamps the current limit of the secondary inverter, electrically connects the secondary inverter output to the source inverter output, and scales the current commanded of the secondary inverter to the command requested by a site controller;

wherein the apparatus is capable of forcing power to flow between the DC power source and the DC load from a lower potential to a higher potential, or from a higher potential to a lower potential, in a current-limited, bi-directional manner.

9. The apparatus of claim 8, wherein the synchronizer is external to the source inverter and the secondary inverter.

10. The apparatus of claim 8, wherein the source inverter PWM output has a frequency between 100 Hz and 400 Hz.

11. The apparatus of claim 8, wherein the source inverter PWM output has a frequency greater than 400 Hz.

12. The apparatus of claim 8, wherein the inductive filter is an LCL filter.

13. The apparatus of claim 8, wherein the inductive filter is a 1:1 isolation transformer.

14. The apparatus of claim 8, wherein the inductive filter is a transformer.

15. The apparatus of claim 8, wherein the inductive filter is a poly-phase filter.

16. The apparatus of claim 8, wherein the input DC power source is a photo-voltaic power source.

17. The apparatus of claim 8, wherein the input DC power source is a battery.

18. The apparatus of claim 8, wherein the input DC power source is a fuel cell.

19. The apparatus of claim 8, wherein the input DC power source is a windmill.

20. The apparatus of claim 8, wherein the input DC power source is selected from the class of sources consisting of
- a DC generator, and
- a rectified AC generator.

* * * * *